US009767217B1

United States Patent
Austern et al.

(10) Patent No.: US 9,767,217 B1
(45) Date of Patent: Sep. 19, 2017

(54) STREAMING GRAPH COMPUTATIONS IN A DISTRIBUTED PROCESSING SYSTEM

(71) Applicant: Google Inc., Mountain View, CA (US)

(72) Inventors: Matthew Harold Austern, Palo Alto, CA (US); Reuven Lax, Seattle, WA (US); Vyacheslav Alekseyevich Chernyak, Seattle, WA (US)

(73) Assignee: Google Inc., Mountain View, CA (US)

( * ) Notice: Subject to any disclaimer, the term of this patent is extended or adjusted under 35 U.S.C. 154(b) by 639 days.

(21) Appl. No.: 14/288,456

(22) Filed: May 28, 2014

(51) Int. Cl.
*G06F 17/00* (2006.01)
*G06F 17/30* (2006.01)

(52) U.S. Cl.
CPC .. *G06F 17/30958* (2013.01); *G06F 17/30569* (2013.01); *G06F 17/30312* (2013.01); *G06F 17/30424* (2013.01)

(58) Field of Classification Search
None
See application file for complete search history.

(56) References Cited

U.S. PATENT DOCUMENTS

| | | | | |
|---|---|---|---|---|
| 2009/0322769 A1* | 12/2009 | Zhou | ......................... | G06F 8/31 345/522 |
| 2010/0088325 A1* | 4/2010 | Goldstein | ......... | G06F 17/30516 707/756 |
| 2012/0054129 A1* | 3/2012 | Aggarwal | ............ | G06N 99/005 706/12 |
| 2012/0166368 A1* | 6/2012 | Kim | ....................... | G06N 7/005 706/12 |
| 2014/0280128 A1* | 9/2014 | Branson | ............ | G06F 17/30516 707/736 |
| 2014/0317148 A1* | 10/2014 | Branson | ............ | G06F 17/30958 707/798 |

(Continued)

OTHER PUBLICATIONS

Computation Model—MillWheel: Continuous Computation "MillWheel: Continuous Computation" Feb. 28, 2013. (online) Retrieved on: Nov. 7, 2013. Retrieved from the Internet: https://sites.google.com/a/google.com/millwheel/Home/ComputationModel, 9 pages.

(Continued)

*Primary Examiner* — Dung K Chau
(74) *Attorney, Agent, or Firm* — Fish & Richardson P.C.

(57) ABSTRACT

Methods, systems, and apparatus are described for performing streaming graph computations in a distributed processing system. In one aspect, a method includes receiving, during a first superstep, streaming graph input that comprises continuous input of first graph updates for updating the state of an existing graph, the existing graph comprising a plurality of vertices and edges, and each first graph update specifying a vertex and a message; scheduling, during the first superstep, the first graph updates for processing during a second superstep; providing, during the first superstep, the first graph updates as input to a graph computation for the existing graph; determining that the graph computation has completed processing for the first superstep, and in response: initiating the second superstep; and processing, during the second superstep, each first graph update; and providing, during the second superstep, graph output based at least in part on the first graph updates.

20 Claims, 5 Drawing Sheets

(56) References Cited

U.S. PATENT DOCUMENTS

2015/0149507 A1* 5/2015 Imaki ............... G06F 17/30516
  707/798
2015/0261886 A1* 9/2015 Wu .................. G06F 17/30958
  707/798

OTHER PUBLICATIONS

Austern et al., "Pregel+MillWheel-initial design doc", (externally published) Jun. 15, 2012, 12 pages.
Malewicz et al., Pregel: A System for Large-Scale Graph Processing SIGMOD'10, Jun. 6-11, 2010, 11 pages.
Stanton and Kliot, "Pregel/MillWheel A design for steaming graph computing", (online), Retrieved on Nov. 7, 2013. Retrieved from the internet: http://research.microsoft.com/apps/pubs/default.aspx?id=166151), 20 pages.
Stanton et al., "Streaming Graphic Partitioning for Large Distributed Graphs" KDD, Aug. 12-16, 2012, 9 pages.
Cai et al., "Facilitating Real-Time Graph Mining" CloudDB'12, Oct. 29, 2012, 8 pages.
Cheng et al., "Kineograph: Taking the Pulse of a Fast-Changing and Connected World" University of Washington, Microsoft Research Asia, [retrieved from the internet on Oct. 15, 2013 ], 20pages.

\* cited by examiner

STREAMING GRAPH COMPUTATIONS IN A DISTRIBUTED PROCESSING SYSTEM

BACKGROUND

This specification relates to streaming graph computations in a distributed processing system.

Distributed processing systems are systems that include multiple data processors that can be assigned to perform various tasks, or processes. They may include, for example, thousands of data processors that are each capable of performing a number of different processes. Distributed processing systems may be used for processing large volume of data and/or for processing continuous streams of data. A graph computation, e.g., a process performed on a dataset that is represented in a graph, is one example task that may be performed using a distributed processing system.

SUMMARY

In general, one innovative aspect of the subject matter described in this specification can be embodied in methods that include the actions of receiving, during a first superstep, streaming graph input that comprises continuous input of first graph updates for updating the state of an existing graph, the existing graph comprising a plurality of vertices and edges, and each first graph update specifying a vertex and a message; scheduling, during the first superstep, the first graph updates for processing during a second superstep that is subsequent to the first superstep; providing, during the first superstep, the first graph updates as input to a graph computation for the existing graph; determining that the graph computation has completed processing for the first superstep, and in response: initiating the second superstep; and processing, during the second superstep, each first graph update scheduled for processing during the second superstep; and providing, during the second superstep, graph output based at least in part on the first graph updates. Other embodiments of this aspect include corresponding systems, apparatus, and computer programs, configured to perform the actions of the methods, encoded on computer storage devices.

These and other embodiments can each optionally include one or more of the following features. The method may further include: processing, during the first superstep, previous graph updates that were scheduled for processing during the first superstep; and providing, during the first superstep, graph output based at least in part on the previous graph updates.

Determining that the graph computation has completed processing for the first superstep may include: monitoring a cursor for the graph computation, the cursor specifying an oldest superstep for which a graph update is to be processed; and determining that the graph computation has completed processing for the first superstep in response to the cursor specifying the second superstep as the oldest superstep for which a graph update is to be processed.

Processing each first graph update may include, for each vertex receiving a first graph update, executing computation instructions for the vertex specified by the first graph update. The graph output may be generated during execution of the computation instructions for at least one vertex specified by one of the first graph updates. During the first superstep, each first graph update may be stored in a vertex input buffer for the vertex specified by the first graph update.

Each vertex may have a vertex cursor that specifies an oldest superstep for which a graph update included in the vertex input buffer for the vertex is to be processed by computation instructions for the vertex. The cursor for the graph computation may be determined based on the vertex cursors.

For each vertex having a first graph update stored in the vertex input buffer for the vertex, a vertex timer may be set for the vertex, the vertex timer specifying the second superstep, and execution of computation instructions for the vertex may depend upon the vertex cursor for the vertex specifying the second superstep.

Each message specified by each first graph update may include one of: state data for the vertex specified by the first graph update; an incoming edge to the vertex specified by the first graph update; an outgoing edge from the vertex specified by the first graph update; or a removal of an edge associated with the vertex specified by the first graph update.

The method may further include: receiving, during the second superstep, streaming graph input that comprises a continuous input of second graph updates for updating the state of the existing graph; scheduling, during the second superstep, the second graph updates for processing during a third superstep that is subsequent to the second superstep; providing, during the second superstep, the second graph updates as input to the graph computation for the existing graph; determining that the graph computation has completed processing for the second superstep, and in response: initiating the third superstep; and processing, during the third superstep, each second graph update scheduled for processing during the third superstep; and providing, during the third superstep, graph output based at least in part on the second graph updates.

A vertex history may be maintained for each vertex in the existing graph, the vertex history specifying, for each of a plurality of supersteps, a historical state for the vertex at the superstep.

Particular embodiments of the subject matter described in this specification can be implemented so as to realize one or more of the following advantages. Performing graph computations with streaming input allows a graph computation to be updating during performance of a computation based on external input. Unlike graph computations performed without streaming input, there is no need to re-create a graph each time a computation is to be performed, or to wait for a graph computation to complete before providing additional input. The ability to process external data received after a graph computation has started may increase the speed and accuracy of a graph computation relative to graph computations that are not capable of processing streaming input while a graph computation is running. The use of a cursor to track graph computation progress can maintain integrity of the graph computation by enforcing an order in which graph updates are processed. The output generated by a streaming graph computation may reflect changes introduced by real-time graph updates in a relatively short period of time following receipt of the updates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
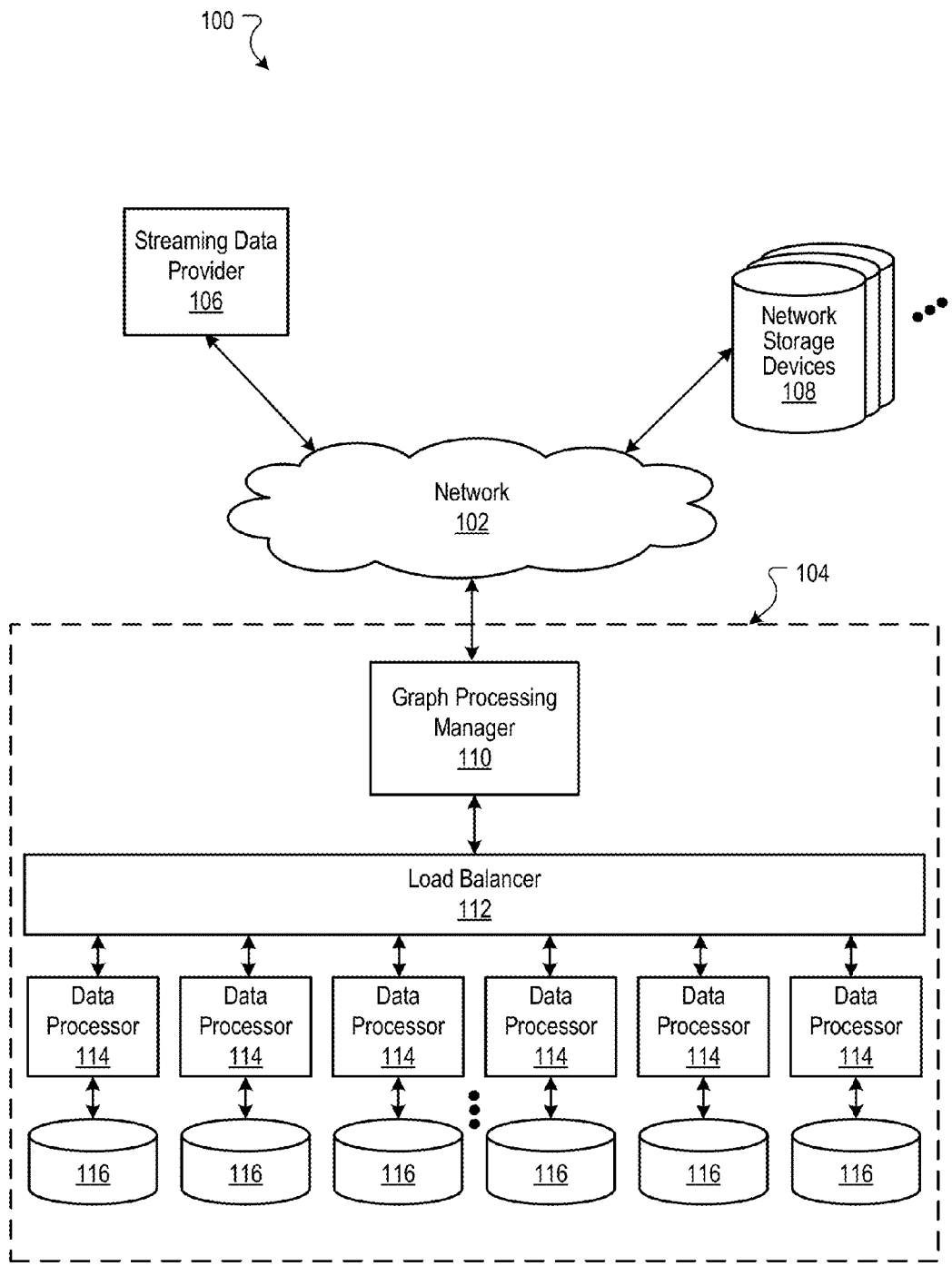
FIG. 1 is a block diagram of an example environment in which a streaming graph processing system operates.

A streaming graph processing system (SGPS) performs a computation on a graph by a distributed processing system. The distributed processing system may include many data processors that can each be assigned to perform one or more processes on a data represented in a graph, and the SGPS allows streaming input to be introduced into a running graph computation.

Graph representations of data generally include vertices and edges, and each vertex and edge in a graph may include data that reflects the state of the corresponding vertex or edge. For example, a social network represented by a graph may use vertices to represent users, and edges to represent connections between users. Each vertex of a social graph may include data representing the state of the user, such as an identifier for the user/vertex, a number of connections, or number of endorsements for the user. Each edge of a social graph may be directed or undirected, and may represent a connection with or endorsement of another user. An edge representing a connection with another user may, for example, be an undirected edge, and it may include data representing the state of the connection, such as a connection type (e.g., friend, co-worker, etc.) or a timestamp indicating a time the users became connected. An edge representing an endorsement of another user may, for example, be a directed edge, and may simply include a timestamp indicating the time associated with the endorsement.

A graph computation may be performed on a variety of graphs with a variety of potential uses. Example computations include shortest path computations, clustering algorithms, and determinations of connectedness, to name a few. Processing requirements for graph computations also vary, and large graphs with many vertices and edges may benefit from using distributed processing systems to perform computations. Distributed processing systems perform graph computations by distributing the load across multiple data processors, e.g., each data processor may be responsible for performing a portion of a computation on a set of vertices. In the description that follows, graph computations proceed in supersteps, where each superstep is a period of time during which a single iteration of a graph computation is performed for the vertices of a graph. Some graphs are frequently updated with a streaming input of data, such as a large social graph with new users, connections, endorsements, and other data frequently being introduced to the graph. A SGPS facilitates the performance of computations, including continuous computations and computations with a definite end, on a graph that has streaming input. As used herein, continuous computations and/or input may include, but are not limited to, constant or perpetual computations and/or input. Continuous computations and input need not be uninterrupted, and may in fact be periodic, e.g., running in uneven supersteps, pausing, or performed/provided periodically in batches of one or more units of input. Continuous computations and input may also have an end, e.g., as defined by a user or a particular computation.

For example, during a superstep, graph updates are provided, as input, to a running graph computation for the existing graph. Each graph update specifies a vertex and a message; the vertex specifying a new or existing vertex of the graph, and the message specifying an action to be taken, e.g., edge creation/deletion. Streaming graph updates include changes to the current state of the graph, e.g., changes relative to the state of the graph in previous supersteps. Graph updates for an existing social graph, for example, may include new vertices for new users of the social network and new edges for new connections between new and existing users. During the first superstep, graph updates received by the SGPS may be scheduled for processing during the next superstep, e.g., the next iteration of the graph computation.

Graph computations may be defined by an administrator, and may be configured to perform a variety of computations on the graph. For example, a trending user computation may be designed to identify the ten vertices with the most incoming edge connections within a certain period of time, while a spam detection computation may be designed to identify vertices averaging a threshold number of new outgoing edges within a past period of time. Computations may be performed by executing, during each superstep, a computation function for each vertex. Within a superstep, e.g., superstep N, graph computations may be parallel between vertices, and the order may not matter, because vertices have no access to other vertices' state except via messages. The computation function is the same for each vertex and may, for example, read messages, e.g., graph input, provided in the previous superstep N−1, send messages to other vertices that are to be received at superstep N+1, and modify the state of the vertex and/or its outgoing edges.

The SGPS will not process the updates scheduled for superstep N+1 until the graph computation has completed for updates that were scheduled to be processed in superstep N. When the SGPS determines that processing for the current superstep N is complete, the SGPS may advance the superstep to N+1, causing execution of the computation function for each vertex that has received an update scheduled for processing in superstep N+1. New graph updates received by the SGPS during superstep N+1 will be scheduled for delivery during superstep N+2.

Graph computation output may be generated by individual vertices, e.g., as part of the computation function executed on each vertex, and/or provided by other portions of the SGPS, such data aggregators. Data aggregators monitor vertices of the graph and make the data available to other vertices, and/or to be output by the SGPS. For example, the computation function may cause each vertex to provide a data aggregator with a value representing the state of the vertex, and the data aggregator may make various uses of the state information, such as identifying a maximum value, calculating an average of received values, and/or communicating state information to other vertices or portions of the SGPS.

These features and other features are describe in more detail below.

FIG. 1 is a block diagram of an example environment 100 in which a streaming graph processing system operates. A computer network 102, such as a local area network (LAN), wide area network (WAN), the Internet, or a combination thereof, connects a streaming graph processing system (SGPS) 104, a streaming data provider 106, and one or more network storage devices 108. The SGPS 104 may be implemented in by a distributed processing system and include, for example, a graph processing manager 110, a load balancer 112, and multiple data processors 114. In addition, the individual data processors may each have a local storage device 116. While the network storage devices 108 are depicted separately from the SGPS 104, they may also be included in the SGPS 104.

The streaming data provider 106 provides data for processing by the SGPS 104. In some implementations, the data may be in the form of graph input, e.g., data records that each include a vertex and a message. In some implementations, the data may have another structure, or be unstructured, and can be formatted as graph input by the SGPS 104. By way of example, the SGPS 104 may configured to perform a graph computation that determines the shortest path between vertices, and graph updates may be in the form of data records that each specify either an existing vertex or new vertex, and a message—such as a change in a value for the specified vertex, or an edge between the specified vertex and another vertex in the graph.

The SGPS 104 may obtain data records and other input, e.g., from the streaming data provider 106 and/or network storage devices 108, and perform a graph computation on the received data. In some implementations, the graph computation is performed on a pre-existing graph with streaming updates, e.g., initial input for the SGPS 104 at a first superstep may be an existing graph, and streaming input may be introduced in later supersteps in the form of new vertices and edges to add to the existing graph. In some implementations, the graph is built from graph input provided to the SPGS 104, and streaming updates are added to the graph throughout the computation, e.g., initial input for the SGPS 104 may be one or more data records that each include a vertex and a message, and the SGPS 104 may use the input to build a graph in a first superstep, and update the graph in later supersteps. Output from the SGPS 104 may be provided to the streaming data provider 106, one or more of the network storage devices 108, or another entity, such as another distributed processing system performing computations on the output of the SGPS 104.

The graph processing manager 110 may, in some implementations, be implemented by one or more of the data processors 114 of the SGPS 104, or may be a stand-alone data processing device/system. The graph processing manager 110 may include components for handling graph input, graph queries, storing and updating the state of an existing graph, monitoring computation progress, and distributing input to the data processors 114 for processing. An optional load balancer 112 facilitates the distribution of graph input to the various data processors 114, e.g., based on current data processor load, processing requirements of input, and computation progress. The load balancer 112 may be included in the graph processing manager 110 or, as depicted in the example environment 100, a standalone component implemented, for example, by one or more of the data processors 114 of the SGPS 104.

The SGPS 104 may include thousands of data processors 114 which can perform processes independently or in combination with other data processors 114. Each data processor 114 may be managed by the graph processing manager 110 and monitored by the load balancer 112. For example, each data processor 114 may be responsible for a set of vertices of a graph and will execute graph computation instructions on each vertex for which the data processor is responsible. When the SGPS 104 receives graph updates, the graph processing manager 110 may, for each graph update, send the graph update to the data processor responsible for the vertex specified by the graph update.

Network storage devices 108 provide temporary and long-term storage for the SGPS 104 and, in some implementations, for individual data processors 114, the graph processing manager 110, the load balancer 112, and/or the streaming data provider 106. While the network storage devices 108 are depicted separately, they may also be part of the SGPS 104.

While some examples described below refer to vertices performing computations, executing instructions, and/or taking other actions as part of a graph computation, the actual computation instructions are executed by data processing apparatus. For example, the data processor responsible for a particular vertex may be the performer of a vertex's computation.

Figure 2:
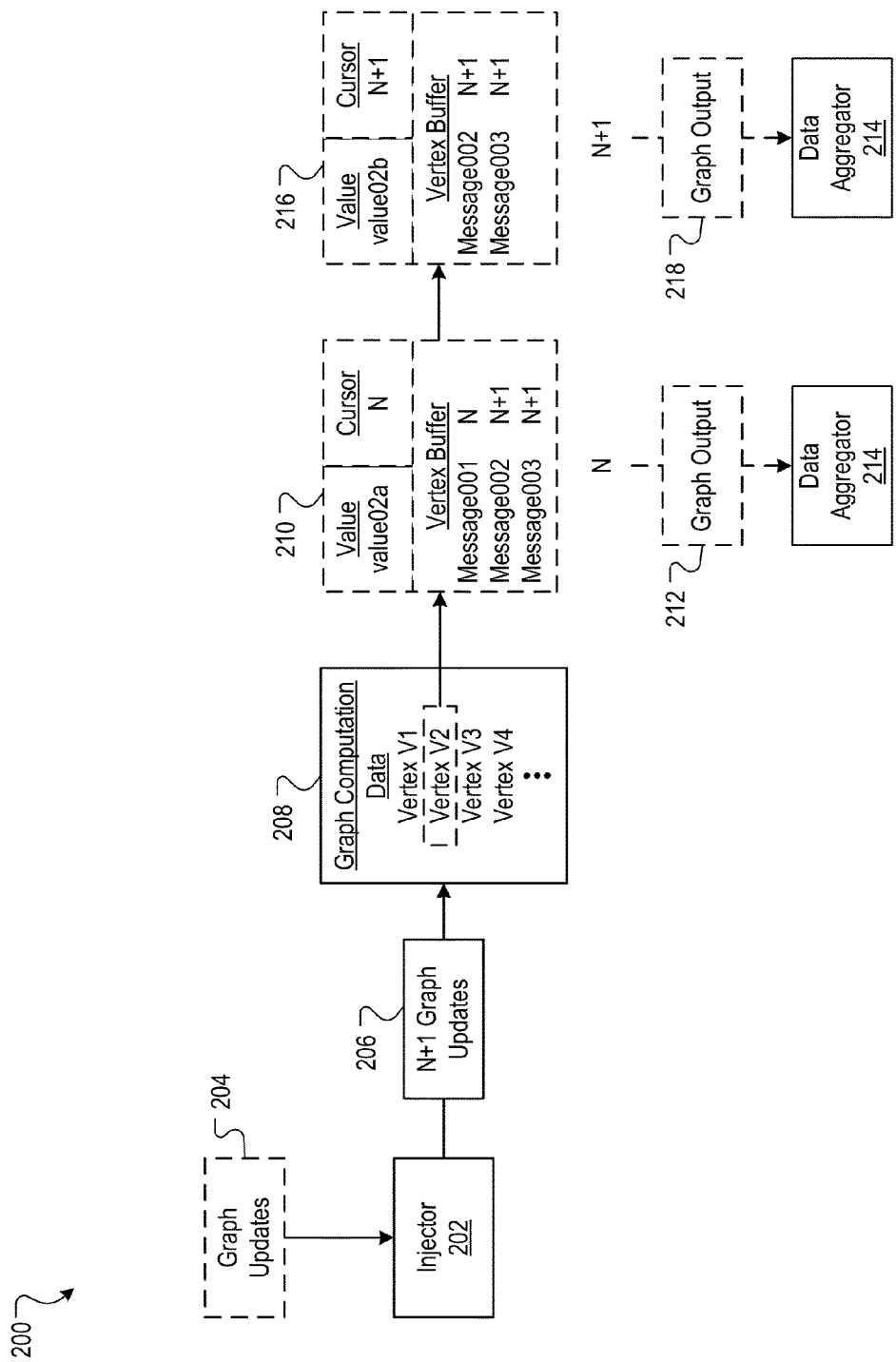
FIG. 2 is an illustration of an example process for performing a graph computation with streaming input data.

FIG. 2 is an illustration 200 of an example process for performing a graph computation with streaming input data. The process may be performed by, for example, a graph processing manager 110, either alone or in combination with other components of a SGPS, such as the SGPS 104 described with reference to FIG. 1.

Graph computations proceed in supersteps, where each superstep encompasses a logical period of time that may vary in terms of actual time elapsed. For example, a computation may begin in superstep 0 with either an existing graph, or with graph input used to create an initial graph. In each superstep, a vertex may, for example, be created, be deleted, perform a computation that may modify the state of the vertex, read messages, send messages to other vertices, and/or send messages requesting creation or deletion of vertices and edges. Messages sent from one vertex to another are received in the superstep after they are sent.

An injector 202 component receives graph updates 204 from a streaming data source. In some implementations, the streaming data source is a streaming data provider, e.g., a streaming data provider 106 described in FIG. 1. In some implementations, the streaming data source is a storage device that include graph updates for processing, e.g., one or more of the network storage devices 108 described in FIG. 1. Graph updates may also come from a combination of streaming data sources.

Each graph update may specify a vertex and a message. The vertex specified by a graph update is the vertex to which the update is provided, and the message will be processed by the specified vertex. For example, a graph update may specify a particular vertex of an existing graph, and the message may cause the particular vertex to update the state of the vertex, e.g., by changing a value for the vertex. As another example, a graph update may specify a new vertex that is not included in an existing graph, and the message may represent an initial state for the new vertex, such as a value for the vertex or an edge from the new vertex to another vertex in the existing graph.

When the injector 202 receives graph updates 204, it tags, or schedules, the graph updates to be performed during the next superstep. For example, graph updates 204 received by the injector 202 during superstep N may be scheduled for being processed in superstep N+1. After scheduling each received graph update, the injector 202 provides the N+1 graph updates 206 as input to a graph computation.

In some implementations, the injector 202 need not schedule all graph updates 204 received in superstep N for processing in superstep N+1. The injector 202 may schedule a proper subset of the received graph updates for processing in superstep N+1, while scheduling others for processing during another superstep. For example, the injector 202 may include an input buffer for buffering graph updates, and only schedule up to a maximum number of graph updates, e.g., 1,000 updates, for processing in a given superstep. Updates that exceed the maximum number may be scheduled for a later superstep. In some implementations, the injector 202 may have a minimum number of graph updates to provide in a given superstep, e.g., the injector may wait until an input buffer includes 10 graph updates before scheduling them for the next superstep and providing them as input to a graph computation.

In some implementations, the injector 202 delays providing updates to the graph computation. For example, the injector 202 may buffer received updates for period of time, e.g., 100 ms, 1 second, or 1 minute, before delivering them to the graph computation. The period of time may be fixed, e.g., predetermined by an administrator or hardcoded into the injector 202, or variable. Variable buffering times may depend on several factors, such as an average length of time that the graph computation takes to process updates for a superstep, or the length of time the graph computation took to process updates in the most recently completed superstep. As another example, a variable buffer time may inversely proportional to the volume of streaming input, e.g., higher volumes of streaming input may lead to lower buffer time periods. Other methods or combinations of methods for delaying input to a graph computation may also be used, such as a rule for delivering graph updates to a graph computation only in odd-numbered supersteps, or waiting for a graph computation to be idle, e.g., finished processing of all graph updates, before delivering new graph updates.

In some implementations, the injector 202 will refrain from scheduling and providing updates for more than a particular number of supersteps ahead of a current superstep. For example, if a graph computation has not yet finished processing graph updates scheduled for processing in superstep 3, the injector may refrain from providing the graph computation with graph updates scheduled for superstep 5 until the graph computation has advanced to superstep 4, keeping the input to the graph computation no more than one superstep ahead of the current graph computation superstep. The progress, e.g., current superstep, of a graph computation may be determined using cursors, which are described in further detail below.

The example illustration 200 includes graph computation data 208 that includes the vertices of the graph on which the graph computation is being performed. The graph computation data 208 may exist on one or more storage devices included in and/or connected to the SGPS. For example, the graph processing manager may maintain a table or other data structure indicating the vertices of the graph and information regarding the current state of the vertices. As graph updates are added to the computation, the graph processing manager may use the table to provide each graph update to data processor responsible for the vertex specified by the graph update.

The example illustration 200 includes a first state 210 for an example vertex, Vertex V2, at a superstep N. The first state 210 may be stored, for example, in local storage for the data processor responsible for Vertex V2, local storage for the graph processing manager of the SGPS, and/or networked storage devices. At superstep N, the first state indicates an example value, value02a, for Vertex V2, as well as a vertex buffer and a cursor. The vertex buffer includes graph updates that are currently processing or to be processed by the vertex. The cursor for the vertex specifies the superstep for which the vertex is still processing updates, e.g., the first state 210 indicates that Vertex V2 has not yet processed Message001, which was scheduled for processing during superstep N.

During superstep N, the vertices of the graph that have input to be processed, such as Vertex V2, execute graph computation instructions. During execution of the graph computation instructions, vertices may read messages received in superstep N−1, e.g., those scheduled for processing in superstep N, such as Message001. Graph updates, e.g., messages, that are scheduled for processing in superstep N+1 may also be received during superstep N, e.g., Message002 and Message003. In some implementations, vertices may also provide graph output 212 during execution of graph computation instructions. The graph output 212 is delivered to a data aggregator 214 in the example illustration 200, which may use graph output in a manner described in further detail below. In some implementations, the graph output 212 may be delivered to another recipient, including, for example, a data storage device, an injector for another graph computation, another vertex of the existing graph (e.g., Vertex V1), and/or a user device for display.

One or more aggregators, such as the data aggregator 214 depicted in the example illustration 200, may provide communication and/or monitoring services for the SGPS. Each vertex can provide output, such as a value, to an aggregator in a superstep, and the aggregator can process the received output, e.g., by aggregating values, and make the result of the processing available to all vertices in a subsequent superstep. Aggregators may also monitor data, such as vertex values and/or aspects of graph topology, and provide notifications or other output internally or externally. For example, a data aggregator may notify the graph processing manager when a number of vertices and edges included in the graph reaches a threshold value, e.g., a value that would require additional system resources to continue the graph computation.

In some implementations, combiners may be included in the SGPS to reduce overhead in processing messages and to prevent potential conflicts in graph state changes. A combiner may be implemented by one or more data processors of the SGPS, and it combines messages destined for a particular vertex. For example, if a vertex is receiving three graph updates that each include a message instructing the vertex to increment its value by 1, a combiner may replace the three messages with a single message to increment its value by 1. As another example, if a graph computation receives two graph inputs in the same superstep, one to create a vertex and one to delete the same vertex, a combiner may combine the input, which may result in cancellation of the input. In some implementations, potential conflicts may be resolved, e.g., by a combiner, injector, and/or graph processing manager, by intentionally scheduling potentially conflicting graph updates for processing in different supersteps. For example, whenever a graph input specifies a change to graph topology, e.g., creation or deletion of a vertex or edge, other graph input specifying the vertex affected by the topology change may be scheduled for processing in a subsequent superstep.

As an example graph and graph computation, a graph may be built to represent websites on the Internet, or a portion of the Internet, with vertices representing websites and directed edges representing links between websites. An example graph computation may identify popular websites based on the number of incoming links, e.g. each website with more than 100 incoming links may be deemed popular. The streaming graph computation may begin from scratch, e.g., without an existing graph, or it may begin with an existing graph. During a superstep, each vertex executes graph computation instructions that process incoming messages, which in this example may include a message from a website establishing a link to the website represented by the vertex. If, during a superstep, a vertex's incoming links reaches the 100 link threshold, the vertex may provide vertex output indicating that the website represented by the vertex has 100 incoming links. The output may be provided, for example, to a data aggregator that generates a report for the superstep that indicates every website that reached 100 incoming links during the superstep.

Over time, new websites are generated, websites are taken offline, and links between websites are added and removed. These changes may be introduced into the graph computation as graph updates 204 received by the injector 202. During a superstep N, graph updates, e.g., messages indicating the addition or removal of links between websites, provided to the graph computation by the injector are scheduled for processing in superstep N+1. When the graph computation proceeds to superstep N+1, future graph updates are scheduled for processing in superstep N+2.

As noted above, each vertex includes a cursor that specifies the superstep for which the vertex is still processing updates or, in situations where no updates are left to be processed in the current superstep, the subsequent superstep. Vertex cursors may also measure progress in other manners, e.g., by specifying a superstep for which the vertex guarantees all processing has been completed. A cursor may also be used to monitor progress of the streaming graph computation. For example, an aggregator or graph processing manager may store a cursor that represents a low watermark of the vertex cursors in the system. In this example, the cursor for the graph computation may indicate the oldest superstep for which a vertex included in a graph computation is still processing updates. The cursor may also serve as a guarantee that all updates from supersteps prior to or including the current supersteps have completed processing.

In some implementations, a graph computation cursor may be used to determine the current superstep. For example, when the cursor for the graph computation indicates that all processing for superstep N has finished, the graph computation may advance to superstep N+1. By way of example, the cursor for Vertex V2 may remain at superstep N until the last message scheduled for processing in superstep N, e.g., Message001, has been processed. After Message001 has been processed, the cursor for the vertex may advance to N+1 and, in some implementations, the vertex may begin processing updates scheduled for processing in superstep N+1. The graph computation cursor may remain at superstep N until the cursors of every vertex in the graph advance to N+1. At that point, the graph computation cursor may advance to N+1, and the vertices with graph updates in their respective buffers may execute graph computation instructions for the graph updates scheduled for processing in superstep N+1.

The example illustration 200 includes a second state 216 for Vertex V2, depicted at superstep N+1. The second state 216 indicates a new value, value02b, that may have been updated during the previous superstep, e.g., using the website popularity example, the value could be a running total of incoming links. Graph output 218 provided during superstep N+1 is optional and may include, for example, an indication that the website represented by Vertex V2 has reached 100 or more total incoming links from other websites.

Figure 3:
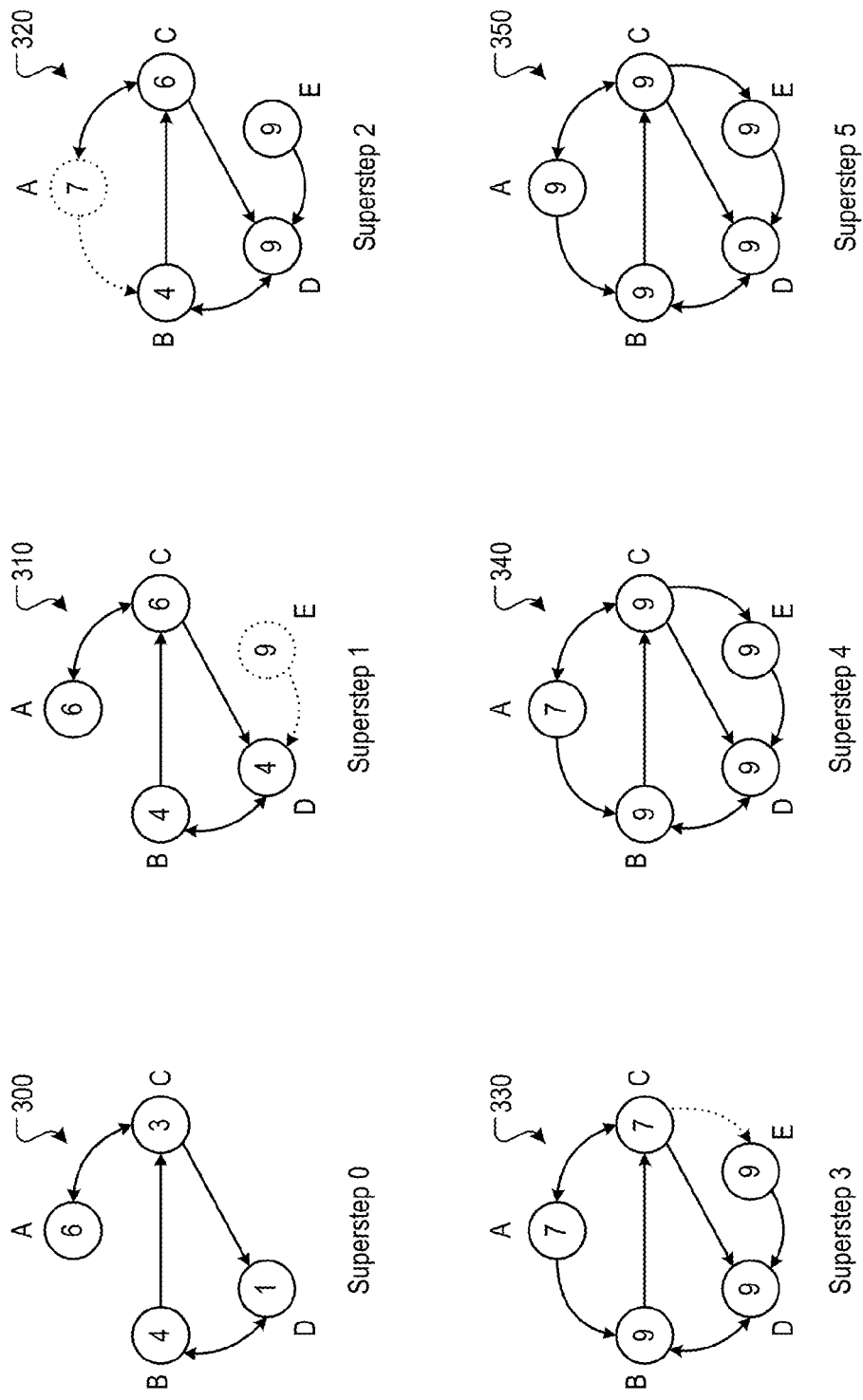
FIG. 3 is an illustration of an example streaming graph computation.

FIG. 3 is an illustration of an example streaming graph computation. The example streaming graph computation propagates a highest vertex value throughout a directed graph. The computation proceeds in supersteps, and the example includes five supersteps labeled supersteps 0-5. In each superstep, any vertex that has learned a larger value from its received messages sends the larger value to all of its neighbors.

In superstep 0, the example graph 300 may have just been initialized, and due to it being the first superstep, the maximum value graph computation may be executed for each vertex. While no input is shown from any prior superstep, each of the four vertices in the graph 300 send their own value to their neighbors via a message that is scheduled to be read, by the receiving vertices, in the next superstep, superstep 1. For example, vertex A sends '6' to vertex C, vertex B sends '4' to vertices C and D, vertex C sends '3' to vertices A and D, and vertex D sends '1' to vertex B. During superstep 0, any graph input provided to the computation, such as vertex E, is also scheduled for processing during superstep 1.

In superstep 1, the example graph 310 includes an additional vertex that was provided by an injector as graph input to the graph computation in superstep 0, e.g., vertex E. During superstep 1, each vertex reads any received messages and/or graph input sent from the previous superstep and, if the vertex learned of a larger value, sends a message to each of its neighbors. For example, vertex A will read the '3' send from vertex C, but because vertex A has a value of 6, it will do nothing with the message and will not send another message because it did not learn of a higher value. Vertex C will read a '6' from vertex A and a '4' from vertex B and keep the higher value; also, because vertex C learned of a larger value, it will send this value, e.g., '6,' to its neighbors. Vertex E was just added in this superstep, and will send its value to vertex D for processing in the next superstep.

In superstep 2, the example graph 320 includes an update to the value for vertex A as well as a new edge from vertex A to vertex B, e.g., provided by an injector as graph input during the previous superstep. During superstep 2, the graph computation proceeds again with each vertex reading any received messages or graph input provided in the previous superstep and, if the vertex learned of a larger value, sending messages to neighboring vertices. For example, vertex A may receive a '6' from vertex C as well as graph input instructing the vertex to change its value to '7.' The message from vertex C will not cause any action, but the change to a larger value of '7' introduced by graph input will cause vertex A to send a message with the value, '7,' to its neighbors, which now include both vertex B and vertex C. Also in superstep 2, vertex D processes a '9' received from vertex E and a '6' received from vertex C, keeping the larger value, '9,' and sending a message with the larger value to its neighbors—vertex B.

In superstep 3, the example graph 330 includes an update introducing a new edge from vertex C to vertex E, e.g., provided by an injector as graph input during superstep 2. The graph computation proceeds in superstep 3 in the same manner as the previous supersteps, e.g., with vertices reading messages received in the previous superstep and, for vertices that learn of a larger value, sending the value to the neighboring vertices. For example, vertex B processes a '7' received from vertex A and a '9' received from vertex D, which causes vertex B to update its value to a '9' and send a message to its neighboring vertices, vertices B and D.

In superstep 4, the example graph 340 has received no external graph updates from the previous superstep for processing, but the graph computation may still advance internally. For example, vertex C learns of a '9' from vertex B, updating its own value and sending a message to its neighbors, vertices A, D, and E.

In superstep 5, the example graph 350 has, again, received no external graph updates from the previous superstep for processing, but the graph computation continues. For example, vertex A learns of a '9' from the message sent by vertex B in superstep 4, updates its value to '9,' and sends a message to its neighbors, vertices A and B.

The foregoing example graph computation may vary based on the computation instructions. E.g., computation instructions executed by each vertex may prevent a vertex from sending a larger value back to the vertex from which it was received. For example, in superstep 1, when vertex C learns of the '6' from vertex A, it may refrain from sending a message back to vertex A. Aggregators may also be used to monitor various aspects of the graph computation, such as the number of vertices updated in each superstep, or the number of messages sent and/or received in a superstep.

In some implementations, vertices may become idle when no input is received for processing. An idle vertex need not execute graph computation instructions while it is idle, e.g., to conserve system resources. For example, in superstep 5, vertex E does not have any messages to process from the previous superstep. The vertex may remain idle and refrain from executing graph computation instructions in subsequent supersteps, e.g., until a new message is received. In some implementations, an entire graph may become idle based on lack of graph input and/or lack of messages to process by the vertices. An idle graph computation is not necessarily completed but may be awaiting further graph input to "wake" the graph and cause further execution of graph computation instructions.

Figure 4:
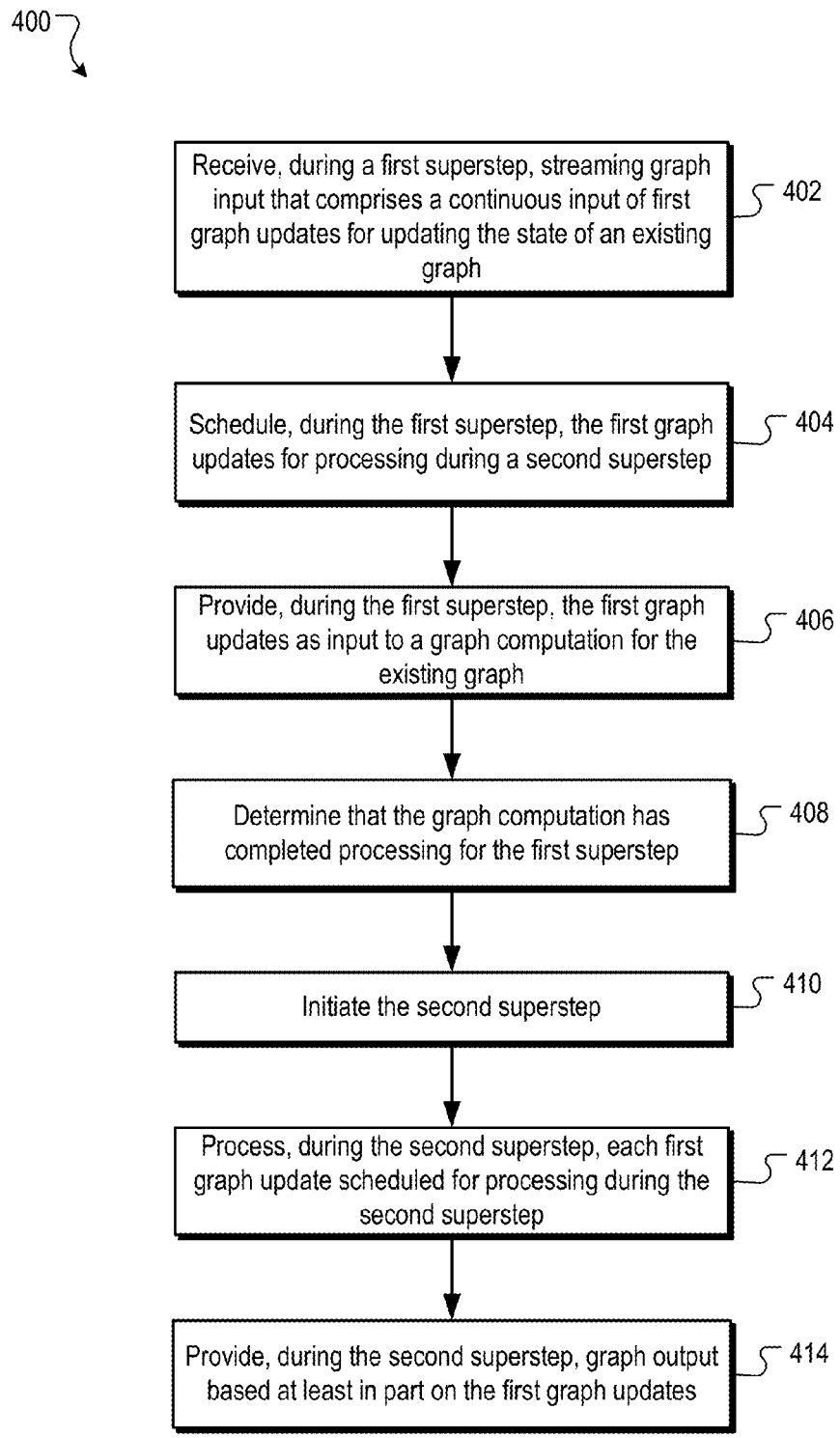
FIG. 4 is a flow diagram of an example process in which a streaming graph computation is performed.

FIG. 4 is a flow diagram of an example process 400 in which a streaming graph computation is performed. The process 400 may be performed by data processing apparatus, such as the graph processing manager described above.

During a first superstep, streaming graph input that includes a continuous input of first graph updates is received for updating the state of an existing graph (402). The existing graph includes vertices and edges, and each first graph update specifies a vertex and a message. For example, a graph may represent a social network, with vertices representing users, and directed edges representing a user endorsement of another user. Streaming input may reflect changes in the social network, e.g., addition and deletion of users and endorsements. For example, a first graph update may specify a user, represented by a vertex, receiving an endorsement, represented by a new edge, from another user, represented by another vertex from which the new edge originates.

During the first superstep, the first graph updates are scheduled for processing during a second superstep (404). For example, an injector component may tag each graph update received in the first superstep with the second superstep so that a receiving vertex will process the update during the second superstep. In some implementations, an injector component may schedule a threshold number of graph updates for processing in the second superstep, e.g., only graph updates received within the past second, or only the first 1,000 graph updates received.

During the first superstep, the first graph updates are provided as input to a graph computation for the existing graph (406). For example, an injector component of a SGPS may provide the graph input to data processors in the SGPS that are responsible for processing graph updates. In some implementations, each first graph update is stored in a vertex input buffer for the vertex specified by the first graph update. The data processor responsible for each vertex may process graph updates included in the input buffer based on a current superstep and the superstep for which an update is scheduled for processing.

In some implementations, each vertex has a vertex cursor that specifies an oldest superstep for which a graph update included in the vertex input buffer for the vertex is to be processed by computation instructions for the vertex. For example, a vertex that is still performing a computation on a graph update scheduled for processing in superstep N will have a cursor of superstep N. If a vertex is still performing a computation on a graph update scheduled for processing in superstep N−1, the vertex will have a cursor of superstep N−1. IF a vertex has no updates in its input buffer, or only updates scheduled for superstep N+1, the vertex cursor will specify superstep N+1.

In some implementations, for each vertex having a first graph update stored in the vertex input buffer for the vertex, a vertex timer is set for the vertex. The vertex timer specifies the second superstep, and execution of computation instructions for the vertex may depend upon the vertex cursor for the vertex specifying the second superstep. For example, a vertex may use its cursor to ensure that all graph inputs scheduled for one superstep are completed before processing updates scheduled for a subsequent superstep.

In some implementations, previous graph updates that were scheduled for processing during the first superstep are processed during the first superstep. For example, the graph computation may have previously received updates that are currently being processed by vertices or in vertex buffers for vertices. The processing of first graph updates may, in some implementations, depend upon finishing the processing of the previous graph updates. In implementations where previous graph updates are being processed in the first superstep, graph output may be provided, during the first superstep, based at least in part on the previous graph updates. For example, a graph computation designed to identify a user being spammed may monitor vertices to determine whether a vertex has received more than a threshold number of endorsements in a single superstep, or in the past few supersteps. If more than the threshold number of endorsements are received during the first superstep, the corresponding vertex may provide output indicating that the user received more than the threshold number of endorsements.

The process 400 determines that the graph computation has completed processing for the first superstep (408). In some implementations, determining that the graph computation has completed processing for the first superstep includes monitoring a cursor for the graph computation. The cursor may specify an oldest superstep for which a graph update is being processed. In implementations where vertices use cursors to track computation progress, the cursor for the graph computation may be based on the vertex cursors. For example, the cursor for the graph computation may be the low watermark vertex cursor, e.g., the vertex cursor that specifies the oldest timestamp. The determination that the graph computation has completed processing for the first superstep may be in response to the graph computation cursor specifying the second superstep as the oldest superstep for which a graph update is to be processed.

In response to determining that the graph computation has completed processing for the first superstep, the second superstep is initiated (410). During the second superstep, each first graph update scheduled for processing during the second superstep is processed (412). In some implementations, the superstep of the computation advances from the first superstep to the second superstep when the graph computation cursor specifies the second superstep. In some implementations, processing each first graph update comprises, for each vertex receiving a first graph update, executing computation instructions for the vertex specified by the first graph update. For example, execution of a graph computation may cause a vertex to process graph updates scheduled for processing during the current superstep, store a total number of new endorsements received in the current superstep, and compare the number of new endorsements to a threshold number. If the total number is greater than a threshold, the graph computation may cause the vertex to send output, e.g., to a data aggregator, as input to another streaming computation, and/or another data processor.

In implementations where vertices use a timer to control execution of computation instructions, the vertex timer may depend upon a graph computation cursor. For example, a vertex may refrain from processing buffered first graph updates until the graph computation cursor has advanced to the second superstep.

In some implementations, each message specified by each first graph update includes one of the following: state data for the vertex specified by the first graph update, such as a total number of endorsements sent by a user represented by the vertex; an incoming edge to the vertex specified by the first graph update, such as a new endorsement for a user represented by the vertex; an outgoing edge from the vertex specified by the first graph update, such as an endorsement from the user represented by the vertex to another user; and removal of an edge associated with the vertex specified by the first graph update, such as the removal of an endorsement of the user represented by the vertex. Messages may include other graph updates, such as the addition of a vertex, which may indicate a new user of the social network, or removal of a vertex, which may indicate a user that has left the social network.

As described above, messages may also be sent from vertices, and not all messages are provided as external graph input. For example, a single graph input may indicate an endorsement of a first user by another user, but the single graph input may only be processed by one vertex, e.g., the vertex doing the endorsing. In this example, graph computation may cause the endorsing vertex that received the graph update to send a message updating the vertex of the endorsed user. In some implementations, graph updates may be provided to every vertex affected by a graph update, which increases the amount of graph input, but reduces the number of messages that need to be sent between vertices.

Graph output is provided, during the second superset, based at least in part on the first graph updates (414). In some implementations, the graph output is generated during execution of the computation instructions for at least one vertex specified by one of the first graph updates. Using the previous example of a graph computation that sends output when a threshold number of endorsements are reached within a superstep, a vertex may provide output during the second superstep if the first graph updates provided to the vertex in the first superstep included at least the threshold number of endorsements of the user specified by the vertex.

In some implementations, a vertex history is maintained for each vertex in the existing graph. The vertex history may specify, for each superstep included in a set of supersteps, a historical state for the vertex at that superstep. For example, a vertex representing a user of a social graph may keep a log of updates to the vertex, such as the number of endorsements received by a user within each of the last X supersteps, where X is a positive integer. The vertex history may, in some implementations, be used by the graph computation. For example, the graph computation may be designed to determine that a user has been spammed with endorsements if the user received more than a threshold number of endorsements in any five superstep period. In order to make the determination, the vertex can sum the endorsements included in the vertex history for comparison to the threshold number. The vertex history may, in some implementations, be used to provide state information in response to a query. For example, a data aggregator or system administrator may query the graph computation to determine the state of the computation at a give superstep. An example query may be a query for the total number of endorsements sent or received in a particular superstep.

In some implementations, the streaming graph computation continues, for example, by receiving, during the second superstep, streaming graph input that includes a continuous input of second graph updates for updating the state of the existing graph, e.g., as updated by the first graph updates. The second graph updates may, during the second superstep, be scheduled for processing during a third superstep that is subsequent to the second superstep. The second graph updates may then, during the second superstep, be provided as input to the graph computation for the existing graph. For example, while the graph computation is processing the first graph updates, the second graph updates may be provided to the vertex buffers for the vertices of the graph. In response to determining that the graph computation has completed processing for the second superstep, the third superstep may be initiated and each second graph update scheduled for processing during the third superstep may be processed during the third superstep. As with the second superstep, output may be provided, during the third superstep, based at least in part on the second graph updates.

The streaming graph computation may continue until a predefined completion, or stopped on demand, e.g., by an administrator. In situations where all graph input has been processed by a graph computation, the graph computation may remain idle until more input is received. In some implementations, the graph computation may end when all vertices are idle. Output from graph computations may be used for reporting, logging, monitoring tasks, to name a few, and may also be used as input into other computations, streaming or otherwise.

Figure 5:
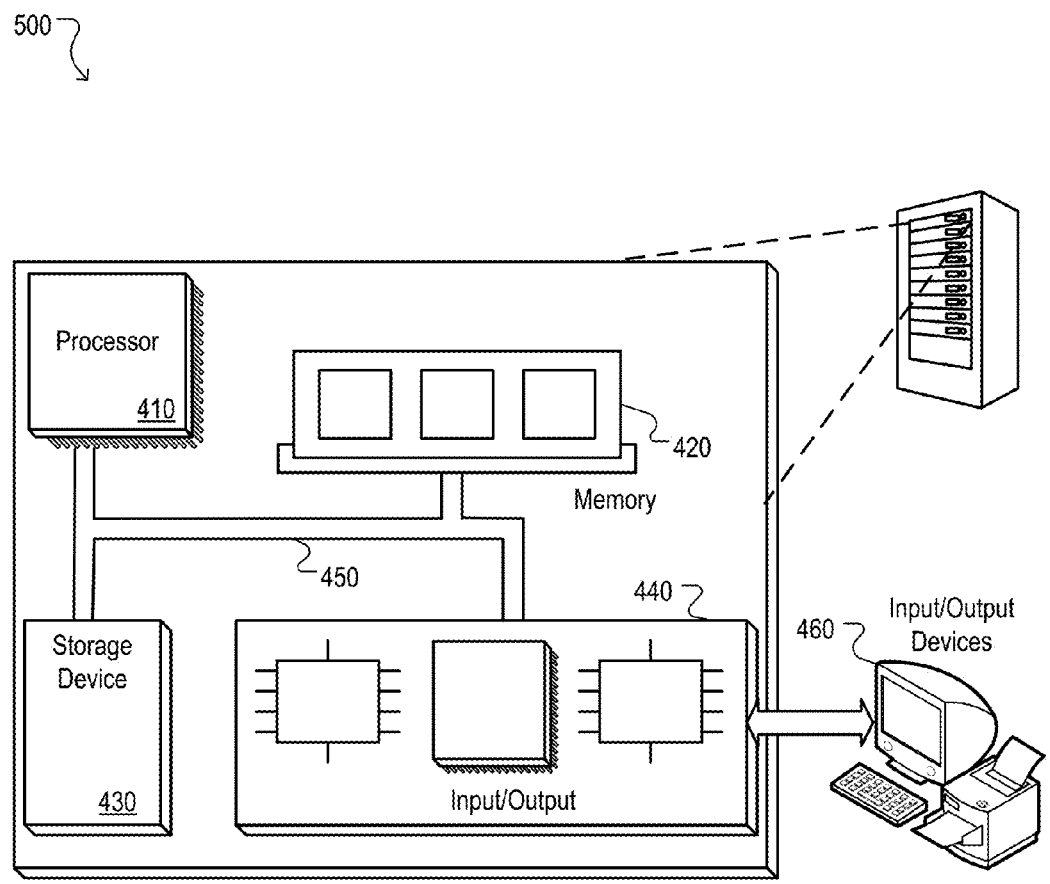
FIG. 5 is a block diagram of an example data processing apparatus.

FIG. 5 is a block diagram of an example data processing apparatus 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/ output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   receiving, during a first superstep, streaming graph input that comprises continuous input of first graph updates for updating the state of an existing graph, the existing graph comprising a plurality of vertices and edges, and each first graph update specifying a vertex and a message;
   scheduling, during the first superstep, the first graph updates for processing during a second superstep that is subsequent to the first superstep;
   providing, during the first superstep, the first graph updates as input to a graph computation for the existing graph;
   determining that the graph computation has completed processing for the first superstep, and in response:
      initiating the second superstep; and
      processing, during the second superstep, each first graph update scheduled for processing during the second superstep; and
   providing, during the second superstep, graph output based at least in part on the first graph updates.

2. The method of claim 1, further comprising:
   processing, during the first superstep, previous graph updates that were scheduled for processing during the first superstep; and
   providing, during the first superstep, graph output based at least in part on the previous graph updates.

3. The method of claim 1, wherein determining that the graph computation has completed processing for the first superstep comprises:
   monitoring a cursor for the graph computation, the cursor specifying an oldest superstep for which a graph update is to be processed; and
   determining that the graph computation has completed processing for the first superstep in response to the cursor specifying the second superstep as the oldest superstep for which a graph update is to be processed.

4. The method of claim 3, wherein processing each first graph update comprises, for each vertex receiving a first graph update, executing computation instructions for the vertex specified by the first graph update.

5. The method of claim 4, wherein the graph output is generated during execution of the computation instructions for at least one vertex specified by one of the first graph updates.

6. The method of claim 4, wherein, during the first superstep, each first graph update is stored in a vertex input buffer for the vertex specified by the first graph update.

7. The method of claim 6, wherein each vertex has a vertex cursor that specifies an oldest superstep for which a graph update included in the vertex input buffer for the vertex is to be processed by computation instructions for the vertex.

8. The method of claim 7, wherein, for each vertex having a first graph update stored in the vertex input buffer for the vertex, a vertex timer is set for the vertex, the vertex timer specifying the second superstep, and wherein execution of computation instructions for the vertex depends upon the vertex cursor for the vertex specifying the second superstep.

9. The method of claim 7, wherein the cursor for the graph computation is determined based on the vertex cursors.

10. The method of claim 1, wherein each message specified by each first graph update comprises one of:
    state data for the vertex specified by the first graph update;
    an incoming edge to the vertex specified by the first graph update;
    an outgoing edge from the vertex specified by the first graph update; or
    a removal of an edge associated with the vertex specified by the first graph update.

11. The method of claim 1, further comprising:
    receiving, during the second superstep, streaming graph input that comprises a continuous input of second graph updates for updating the state of the existing graph;

scheduling, during the second superstep, the second graph updates for processing during a third superstep that is subsequent to the second superstep;

providing, during the second superstep, the second graph updates as input to the graph computation for the existing graph;

determining that the graph computation has completed processing for the second superstep, and in response:
initiating the third superstep; and
processing, during the third superstep, each second graph update scheduled for processing during the third superstep; and
providing, during the third superstep, graph output based at least in part on the second graph updates.

12. The method of claim 11, wherein a vertex history is maintained for each vertex in the existing graph, the vertex history specifying, for each of a plurality of supersteps, a historical state for the vertex at the superstep.

13. A system comprising:
one or more data processing apparatus; and
a data store storing instructions that, when executed by the one or more data processing apparatus, cause the one or more data processing apparatus to perform operations comprising:
receiving, during a first superstep, streaming graph input that comprises continuous input of first graph updates for updating the state of an existing graph, the existing graph comprising a plurality of vertices and edges, and each first graph update specifying a vertex and a message;
scheduling, during the first superstep, the first graph updates for processing during a second superstep that is subsequent to the first superstep;
providing, during the first superstep, the first graph updates as input to a graph computation for the existing graph;
determining that the graph computation has completed processing for the first superstep, and in response:
initiating the second superstep; and
processing, during the second superstep, each first graph update scheduled for processing during the second superstep; and
providing, during the second superstep, graph output based at least in part on the first graph updates.

14. The system of claim 13, wherein the operations further comprise:
processing, during the first superstep, previous graph updates that were scheduled for processing during the first superstep; and
providing, during the first superstep, graph output based at least in part on the previous graph updates.

15. The system of claim 13, wherein determining that the graph computation has completed processing for the first superstep comprises:
monitoring a cursor for the graph computation, the cursor specifying an oldest superstep for which a graph update is to be processed; and
determining that the graph computation has completed processing for the first superstep in response to the cursor specifying the second superstep as the oldest superstep for which a graph update is to be processed.

16. The system of claim 15, wherein processing each first graph update comprises, for each vertex receiving a first graph update, executing computation instructions for the vertex specified by the first graph update.

17. The system of claim 16, wherein the graph output is generated during execution of the computation instructions for at least one vertex specified by one of the first graph updates.

18. The system of claim 16, wherein, during the first superstep, each first graph update is stored in a vertex input buffer for the vertex specified by the first graph update.

19. The system of claim 18, wherein each vertex has a vertex cursor that specifies an oldest superstep for which a graph update included in the vertex input buffer for the vertex is to be processed by computation instructions for the vertex.

20. A non-transitory, computer readable medium storing instructions that, when executed by one or more data processing apparatus, cause the one or more data processing apparatus to perform operations comprising:
receiving, during a first superstep, streaming graph input that comprises continuous input of first graph updates for updating the state of an existing graph, the existing graph comprising a plurality of vertices and edges, and each first graph update specifying a vertex and a message;
scheduling, during the first superstep, the first graph updates for processing during a second superstep that is subsequent to the first superstep;
providing, during the first superstep, the first graph updates as input to a graph computation for the existing graph;
determining that the graph computation has completed processing for the first superstep, and in response:
initiating the second superstep; and
processing, during the second superstep, each first graph update scheduled for processing during the second superstep; and
providing, during the second superstep, graph output based at least in part on the first graph updates.

* * * * *